United States Patent
Zidan

(10) Patent No.: US 10,443,954 B1
(45) Date of Patent: Oct. 15, 2019

(54) HIGH PERFORMANCE METAL HYDRIDE BASED THERMAL ENERGY STORAGE SYSTEMS FOR CONCENTRATING SOLAR POWER

(71) Applicant: Savannah River Nuclear Solutions, LLC, Aiken, SC (US)

(72) Inventor: Ragaiy Zidan, Aiken, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 245 days.

(21) Appl. No.: 14/961,087

(22) Filed: Dec. 7, 2015

Related U.S. Application Data

(60) Provisional application No. 62/087,939, filed on Dec. 5, 2014.

(51) Int. Cl.
| | | |
|---|---|---|
| *F28D 15/00* | (2006.01) | |
| *F28D 20/00* | (2006.01) | |
| *C01B 6/24* | (2006.01) | |
| *C01B 21/072* | (2006.01) | |

(52) U.S. Cl.
CPC ............ *F28D 20/003* (2013.01); *C01B 6/243* (2013.01); *C01B 21/072* (2013.01)

(58) Field of Classification Search
CPC ...... C01B 21/072; C01B 6/243; F28D 20/003
USPC .................................................... 165/104.12
See application file for complete search history.

(56) References Cited

U.S. PATENT DOCUMENTS

| | | | | |
|---|---|---|---|---|
| 4,214,699 A | * | 7/1980 | Buchner | B60H 1/22 123/1 A |
| 6,141,966 A | | 11/2000 | Osumi | |
| 6,328,821 B1 | | 12/2001 | Ovshinsky et al. | |
| 7,462,344 B2 | | 12/2008 | Vajo et al. | |
| 2007/0264182 A1 | * | 11/2007 | Vajo | C01B 3/0078 423/286 |
| 2011/0091352 A1 | * | 4/2011 | Fang | B22F 1/0018 420/591 |

(Continued)

FOREIGN PATENT DOCUMENTS

| | | |
|---|---|---|
| GB | 1503850 | 3/1978 |
| WO | WO 2010147674 | 12/2010 |

OTHER PUBLICATIONS

"Hydrogen storage in calcium alanate First-principles thermodynamics and crystal structures" by Wolverton, 2007.*

(Continued)

*Primary Examiner* — Paul Alvare
(74) *Attorney, Agent, or Firm* — J. Bennett Mullinax, LLC

(57) ABSTRACT

Thermal energy storage (TES) systems based on metal hydride pairs using new class of high efficiency materials are evaluated. The use of low temperature metal cost effective material such hydrides NaAlH4 and Na3AlH6 became possible. In order to obtain high efficiency at reasonable cost high temperature materials were altered by the addition of materials to form reversible alloys and hydrides. The compounds were cycled to determine stability of hydrogen capacity over extended number of cycling. A thermal energy storage system based on two metal hydride pairs such as CaAl/CaH2/Al:NaAlH$_4$, Ca$_2$Si/CaH$_2$/Si:Na$_3$AlH$_6$ and NaMgH$_2$F—Si/Mg2Si—NaF:Na$_3$AlH$_6$ allows low cost and high efficiency performance.

8 Claims, 5 Drawing Sheets

(56) References Cited

U.S. PATENT DOCUMENTS

2011/0100356 A1* 5/2011 Bliesner ............... F28D 20/003 126/618
2014/0238634 A1* 8/2014 Ronnebro ............ F28D 20/003 165/10

OTHER PUBLICATIONS

Publication entitled "The impact of carbon materials on the hydrogen storage properties of light", Philip Adelhelm, 2010.*
Jason Graetz, ISRN Material Science Storage; Artcle ID 863025 2012; Metastable Metal Hydrides for Hydrogen Storage; 18 pages.
Claudio Corgnale, et al.; Screening Analysis of Metal Hydride Based Thermal Energy Storage Systems for Concentrating Solar Power Plants; ScienceDirect; www.elsevier.com/locate.rser, 2014 Elsevier Ltd. pp. 821-833.
Patrick A. Ward, et al. Journal of Alloys and Compounds, poublished online Jan. 20, 2015, High Performance Metal Hydride Based Thermal Energy Storage Systems for Concentrating Solar Power Applciation; www.elsevier.com/locate.jalcom; 5 pages.
D.A Sheppard, et al.; Royal Society of Chemistry; www.rsc.org. advances; Feb. 26, 2014; Hydriding Characteristics of $NaMgH_2F$ with Preliminary Technical and Cost Evaluation of Magnesium-Based Metal Hydride Materials for Concentrating Solar Power Thermal Storage; pp. 26552-26562.

* cited by examiner

HIGH PERFORMANCE METAL HYDRIDE BASED THERMAL ENERGY STORAGE SYSTEMS FOR CONCENTRATING SOLAR POWER

RELATED APPLICATIONS

This application claims the benefit of U.S. Provisional Application 62/087,939 filed on Dec. 5, 2014 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention relates generally to combining the reversible formation of alloys-hydrides at high temperature with the reversible formation of lower temperature hydrides to store thermal heat. The present invention addresses several problems when using dual metal hydride systems for heat storage. It has been determined that new and useful high enthalpy hydrides are well suited to be used to store heat but have side effects of being corrosive and unable to generate sufficient pressure to hydrogenate a low enthalpy hydride on the other side of the system. The present invention utilizes a combination of one or more elements with a suitable hydride or hydrides to modify the enthalpy of the whole system to generate enough pressure to match the pressure required by other hydride. Based upon the ratio of elements and the reaction, the formation of a reversible metallic alloy can be used to tune the pressure and temperature to desired conditions. Further, the unique combination of materials in resulting process solves problems associated with high temperature heat storage such as corrosion and evaporation of metals.

Accordingly, hydrides such as $CaH_2$, $LiH_2$, $MgH_2$ and $MgNaFH_2$ are combined with other elements such as but not limited to Al, Si, and C. These combinations form composites that can be used on one side of a heat storage system as high enthalpy hydrides (HEH) with desired conditions of pressure and temperatures based on the ratio of elements in the composites. In addition, it has been found that the process allows the use of less expensive materials for low enthalpy hydrides (LEH) such as $NaAlH_4$ or $Na_3AlH_6$. Complex hydrides such as the $NaAlH_4$ or $Na_3AlH_6$ are less expensive than the more commonly used AB5 materials such as TiFe or $LaNi_5H_6$. By proper combination of these elements with the high enthalpy hydrides a useful pressure can be obtained to effectively hydrogenate a cost effective LEH's.

The invention makes use of the formation of alloys at high temperatures that occur when a hydride system is dehydrogenated at high temperatures. The formation of alloys, when dehydrogenations occur at high temperatures, was considered to be a reversibility problem because of the need of high temperatures. The present invention takes advantage of the fact that many alloys can be reversed with hydrogenation at high temperatures, which is suited for high temperature thermal heat storage and not just hydrogen storage. The invention solves many problems with high enthalpy hydrides operating in the heat storage system. Many of these hydrides have to be melted first before releasing their hydrogen making them very corrosive to the confining containers. The present invention prevents that from happening by the formation of alloys as an intermediate step.

BACKGROUND OF THE INVENTION

This invention relates to the development of renewable energy technologies to curb fossil fuel consumption given the realization of fossil fuel depletion and concerns related to greenhouse gas emission. Solar energy represents a nearly endless supply of energy in the form of electromagnetic radiation with a greater potential for providing dispatchable power among all the different renewable options. Solar thermal concentrators are among the technologies aimed at harnessing this energy source. High temperature solar plants have the potential to reach low cost electric power production, similar to conventional power plants, only if equipped with cost effective thermal energy storage systems. The common approaches for the storage of heat is through sensible heat in which the heat is simply transferred from a material, latent heat in which a phase change occurs, or thermochemical heat which involves a chemical reaction to release or store heat energy.

A significant amount of research has been applied toward storing sensible heat in molten salts. This technology is currently being employed in concentrated solar thermal power plants. While this technology is the most mature, sensible heat materials suffer from low energy densities and limited transport distances due to thermal losses. Latent heat materials can offer the advantage of higher energy densities and smaller temperature ranges for heat transfer, but the high cost and the corrosive nature of many high temperature phase change materials limit their practicality in concentrated solar thermal storage systems. Thermochemical heat storage systems can provide very high energy densities and economic systems with the right choice of materials. Thermochemical storage materials based on carbonation, oxidation, hydration, and hydrogenation reactions have received the most attention.

SUMMARY OF THE INVENTION

It is one aspect of one of the present embodiments to provide for a metal hydride compound based thermal energy storage system that avoids corrosion problems associated with certain metal hydrides.

It is a further aspect of at least one embodiment of the present invention to provide for a metal hydride compound based thermal energy storage system that is useful for avoiding evaporation or sublimation of the metal hydrides.

It is a further aspect of at least one of the present embodiments of the invention to provide for a high performance metal hydride compound thermal energy storage system in which operating pressures are matched with respect to low temperature and high temperature storage materials.

It is a further aspect of at least present embodiment of the invention to use elemental Al and Si in combination with metal and metal hydride to form composite hydrides-alloys for reversible high temperature energy storage materials. Representative reactions and reaction products are set forth below and include:

$$LiAlH_4 \rightarrow \tfrac{1}{3}Li_3AlH_6 + \tfrac{2}{3}Al + H_2\uparrow \qquad (1)$$

$$\tfrac{1}{3}Li_3AlH_6 \rightarrow LiH + \tfrac{1}{3}Al + H_2\uparrow \qquad (2)$$

$$LiH + Al \rightarrow LiAl + \tfrac{1}{2}H_2\uparrow \qquad (3)$$

The dehydrogenation of magnesium aluminum hydrides (Mg(AlH$_4$)$_2$) is known to proceed as follows:

$$Mg(AlH_4)_2 \rightarrow MgH_2+Al+3H_2 \quad (4)$$

$$MgH_2+Al \rightarrow \tfrac{1}{2}Al_3Mg+\tfrac{1}{2}Al+H_2\uparrow \quad (5)$$

Another example is the dehydrogenation steps of calcium aluminum hydride Ca(AlH$_4$)$_2$:

$$Ca(AlH_4)_2 \rightarrow CaAlH_5+Al+3/2H_2\uparrow \quad (6)$$

$$CaAlH_5 \rightarrow CaH_2+Al+3/2H_2\uparrow \quad (7)$$

$$CaH_2+2Al \rightarrow CaAl_2+H_2\uparrow \quad (8)$$

These known dehydrogenation reactions resulted in forming metallic alloys in 3, 5 and 8

The formation of alloys in the above examples can be hydrogenated reversibly such as in the known reactions:

$$LiH+Al \leftrightarrow LiAl+\tfrac{1}{2}H_2$$

$$2MgH_2+3Al \leftrightarrow Al_3Mg_2+2H_2$$

$$CaH_2+2Al \leftrightarrow CaAl_2+H_2$$

Other examples but not limited to:

$$2MgH_2+Si \leftrightarrow Mg_2Si+2H_2 \quad (9)$$

$$CaH_2+Si \leftrightarrow CaSi+H_2 \quad (10.a)$$

$$2CaH_2+Si \leftrightarrow Ca_2Si+H_2 \quad (10.b)$$

$$XLiH+Si \leftrightarrow Li_xSi+X/2H_2 \quad (11)$$

(e.g for a known phase X=2.35)

$$LiH+CaH_2+3Al \leftrightarrow LiAl+CaAl_2+3/2H_2 \quad (12)$$

$$2LiH+2C \leftrightarrow Li_2C_2+H_2 \text{ (C is carbon)} \quad (13)$$

$$TiHx+Al \leftrightarrow TiAl+x/2H_2 \quad (14)$$

It is a further object of at least one aspect of the present invention to provide for calcium based metal hydride CaH$_2$ or lithium based metal hydride LiH as examples high temperature material which when reacted with Si, C, or Al form an alloy and prevent corrosion.

It is a further object of at least one aspect of one embodiment of the present invention to provide for a method of stabilizing metal hydride materials by reversibly forming alloys that may be used as a high temperature material in thermal energy storage systems.

It is a further aspect of at least one embodiment of the present invention to provide for high temperature alloys compounded metal hydrides that can be repeatedly cycled to reversibly store and release hydrogen.

It is a further aspect of at least one embodiment of the present invention to provide for a process of using metal hydride mixed with different elements to form a mixture to be used in efficient thermal energy storage systems comprising: providing a dual bed hydride reactor having a HEH reaction bed and a LEH reaction bed; applying heat to the HEH reaction bed containing a mixture/composite of at least one hydride selected from the group such as NaMgH$_3$, MgNaFH$_2$, TiH$_2$, LiH, MgH$_2$, CaH$_2$, and combinations thereof and an element from selected from the group consisting of Al, Si, or carbon; reacting hydrogen reversibly with HEH reaction bed containing the mixture/composite to form a reversible alloy; transferring a released hydrogen gas from the reversible alloy to the LEH reaction bed, the LEH reaction bed containing at least one of a metal hydride selected from the group consisting of NaAlH$_4$, Na$_3$AlH$_6$, FeTiHx, MmNi$_6$H$_5$ and combinations thereof; dehydriding the LEH reaction bed and absorbing the hydrogen with the HEH reaction bed thereby yielding heat back from the exothermic process to reach temperatures between about 650° C. to 800° C.

It is a further aspect of at least one embodiment of the present invention to provide dual bed thermal energy storage system comprising: a first reactor bed containing a mixture/composite of at least one hydride selected from the group consisting of NaMgh$_3$, MgNaFH$_2$, TiH$_2$, LiH, MgH$_2$, CaH$_2$, and combinations thereof and an element of Al, Si, or carbon; a second reactor bed comprising at least one of a metal hydride consisting of NaAlH$_4$, Na$_3$AlH$_6$, FeTiHx, MmNi$_6$H$_5$ and combinations thereof; a conduit between the first reactor bed and the second reactor bed wherein when hydrogen gas is released from the second reactor bed and enters the first reactor bed, the hydrogen gas reacts with the metal hydrides therein, the reaction resulting in the exothermic release of heat at a temperature of between 650° C. to 800° C.

It is a further aspect of at least one embodiment of the present invention to provide a process of using metal hydrides in a thermal energy storage system comprising: heating a high temperature metal hydride in the presence of at least one of Al, Si, or carbon to a temperature greater than 650° C. and thereby releasing hydrogen gas and further forming a reversible alloy;

transferring the hydrogen gas to a low temperature metal hydride which absorbs the hydrogen and releases a smaller amount of heat than the high temperature metal hydride; desorbing the low temperature metal hydride and reacting the desorbed hydrogen with the high temperature metal hydride, thereby releasing heat from the exothermic reaction reaching temperatures between 650° C. as high as 800° C.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Additional information related to the present application can be found in the Publication *Screening Analysis of Metal Hydride Based Thermal Energy Storage Systems for Concentrating Solar Power Plants* published in Renewable and Sustainable Energy Reviews 38(2014) 821-833 and which is incorporated herein by reference. The provisional application Ser. No. 62/087,939 further contains a Power Point Presentation (17 pages Appendix) directed to processes, parameters, formulas, materials, and data directed to the present invention. The content of the Power Point presentation is incorporated herein by reference.

The present application also incorporates by reference the publication entitled "*High Performance Metal Hydride Based Thermal Energy Storage Systems for Concentrating Solar Power Applications*" in the *Journal of Alloys and Compounds* published online 20 Jan. 2015 and which is incorporated herein by reference.

Figure 1:
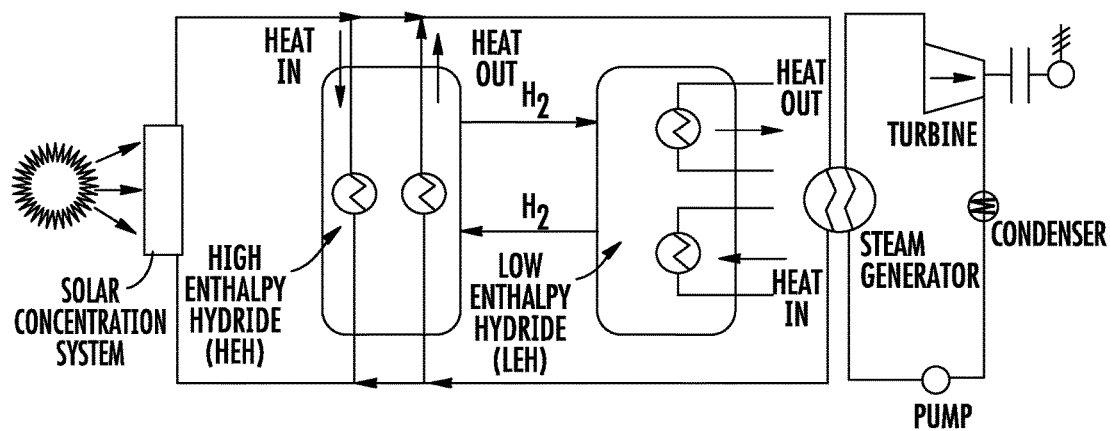
FIG. 1 is schematic of a heat storage system in accordance with the present invention.

Among the power cycles driven by renewable sources, solar power plants have been identified by the Department of Energy (DOE) as a baseline renewable source due to their potential of meeting economic and technical targets and their potential for dispatchability. One of the most common solar electric plants is based on the steam Rankine cycle. A diagram of the overall solar plant is shown in FIG. 1 and it is comprised of the solar concentration section, the Thermal Energy Storage (TES) section (based on the MH system concept), and the power plant (based on a steam Rankine cycle). The same MH based storage system can be adapted for use with other power plants (e.g. Brayton cycle), with only a few minor variations.

This invention solves many problems that accompany the use of hydrides to store thermal energy. The invention uses a modified class of materials to meet performance and cost. The hydrogenation and dehydrogenation reactions of the present invention here alters the enthalpy to store heat at pressure and temperature required by the system but also prevents corrosion and the evaporation of metals when used at high temperature necessary for high efficiency.

A known technology to store heat is a dual bed hydride reactor system. In order to store heat in a dual bed hydride reactor system a high enthalpy hydride (HEH) and a low enthalpy hydride (LEH) are used. During the day the focused sun heat is used to generate steam to produce electricity and some of that heat is stored by heating an endothermic reaction to break the hydrogen metal bond and dehydrogenate the HEH. Then the liberated hydrogen is allowed to follow to the reactor containing LEH and hydrogenate it. When the sun is not shining as at night the hydrogen from the LEH bed is liberated using small amount of heat and allowed to flow to the HEH to start an exothermic reaction and generate heat that can be used to make steam to produce electricity during the night. This known process is using heat from the sun to produce electricity during the day and to store heat to use during the night to continue producing electricity. See FIG. 1.

The power plant shown in FIG. 1 operates 24/7, with the TES system storing and releasing the needed thermal energy to maintain continuous operation of the power section This TES is a self-sustaining system, since the hydrogen moves between the two beds exploiting the small pressure gradients available during charging and discharging processes.

An ideal HEH, also known as high temperature metal hydride (HTMH), material is characterized by high operating temperatures and high reaction enthalpies whereas the ideal LEH, also known as low temperature metal hydride (LTMH), would possess low operating temperatures and low reaction enthalpies. This allows it: (1) to store large amount of heat, during the release of hydrogen from the HTMH; and (2) to provide the LTMH with low thermal power (at low temperatures) during the reverse process (hydrogen release by the LTMH and uptake by the HTMH).

When HEH is chosen, a higher enthalpy hydride is preferred. The high enthalpy is useful to reach high temperature >650° C., leading to high efficiency. High enthalpy hydrides such $CaH_2$, LiH and $TiH_2$ release their hydrogen at very high temperatures above 800° C. but they don't generate enough pressure to hydrogenate the LEH bed. Hydrides that can be acceptable from cost point of view such as $CaH_2$ and $LiH_2$ melt before releasing their hydrogen and in this state they become very corrosive and very difficult to handle in a cost effective containers.

High Performance MH Material TES System and Alteration of Materials

Examples of possible HTMH materials capable of being paired with LTMH materials are $NaMgH_3$, $MgNaFH_2$, $TiH_2$, LiH and $CaH_2$. Although titanium hydride can go to a high temperature without being corrosive the hydrogen pressure of a least about 1 atmosphere generated from titanium hydride is too low to be useful to hydrogenate a cost effective LEH such as sodium aluminum hydrides. Based on this invention the addition of aluminum as shown in equation (14) allows hydrogen to be released at higher pressure to match the LTMH. The cost effective high temperature system, which is comprised of $CaH_2$ material, has several technical hurdles such as corrosion associated with molten $CaH_2$/Ca, low equilibrium pressures at high temperatures, etc. These limitations currently impede practical applications with this material but are addressed by the formation of alloys as set forth herein.

In accordance with the present invention it has been found that the inclusion of Al, Si, or carbon, such as expanded natural graphite, with certain metal hydrides can form useful intermediary alloys which offer numerous advantages for hydrogen storage in a solar powered collection system.

For instance, the inclusion of Si or Al with the metal hydrides can help minimize or avoid corrosion properties associated with certain metal hydrides. For example, when Al, Si, or carbon is added to the $CaH_2$, the calcium hydride does not need to go to molten state to release hydrogen and subsequently corrosion is prevented and equilibrium pressure is increased.

In addition, to the extent certain metal hydrides will evaporate or sublime during dehydrogenation at high temperatures, the inclusion of the Si, Al, or carbon for example will allow for the formation of reversible alloys that prevent the evaporation or sublimation and the compound can still function as hydrogen storage and hydrogen release system. In the case of magnesium-based systems, as another example, the addition of Al, Si, or carbon prevents Mg based hydrides from evaporation or sublimation at high temperatures by forming reversible Mg/Si alloys as shown in the following equations:

$$Mg_2FeH_6+3Al \leftrightarrow Al_3Mg_2+Fe+H_2 \quad (15)$$

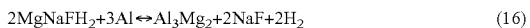
$$2MgNaFH_2+3Al \leftrightarrow Al_3Mg_2+2NaF+2H_2 \quad (16)$$

Or

$$Mg_2FeH_6+Si \leftrightarrow Mg_2Si+Fe+H_2 \quad (17)$$

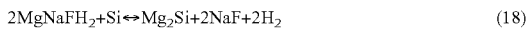
$$2MgNaFH_2+Si \leftrightarrow Mg_2Si+2NaF+2H_2 \quad (18)$$

The inclusion of the elemental materials provides for the formation of reversible alloys which allows one to match pressure within the operating system based on the ratio of the added elemental materials and by controlling the temperatures at which materials may be utilized. An additional advantage of the formation of the reversible alloys is the ability to operate at wide range of higher temperatures of 650° C. or greater. The compound materials also allow for higher heat conductivity without introducing extra dead weight to the process since a metal is part of the compound at all times. A further advantage is that the metal hydrides used tend to be lower cost (e.g. aluminum added to titanium makes compound less costly).

An additional advantage of the alloys is the ability to maintain desirable hydrogen absorption and release characteristics across a large number of $H_2$ absorption and release cycles. The ratio of the hydride to the added elements forms certain phases which can be tuned to reach desired temperatures and operating pressures.

The formulas and reactions identified above will produce useful hydride-alloys composites that can absorb and release hydrogen under useful conditions including these associated with a solar collector environment. The inclusion of Al, carbon or Si, for example, with the appropriate metal hydride has been found to allow for formation of the intermediary reversible alloy to function as hydrogen storage and release material at higher temperatures while avoiding problems associated with the direct use of metal hydrides which have shown difficulties with respect to high temperature environments and reversibility.

High Temperature Material Evaluation

Figure 2:
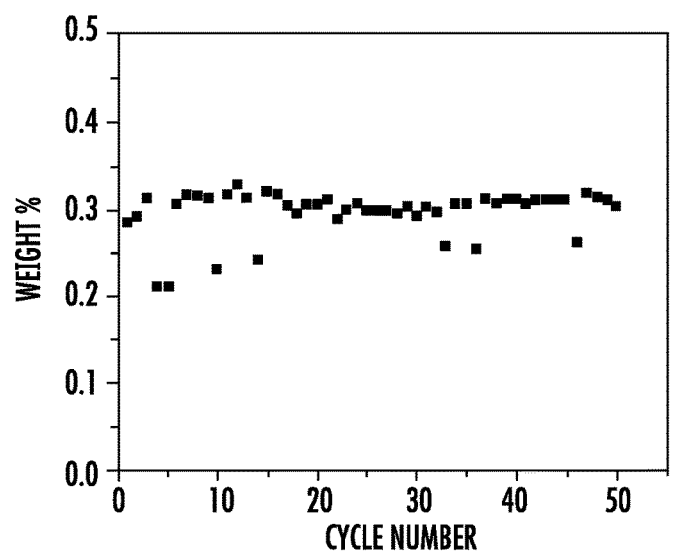
FIG. 2 is a graph setting forth data of CaAl cycling characteristics at 650° C. and 25 bar of pressure.
Figure 3A:
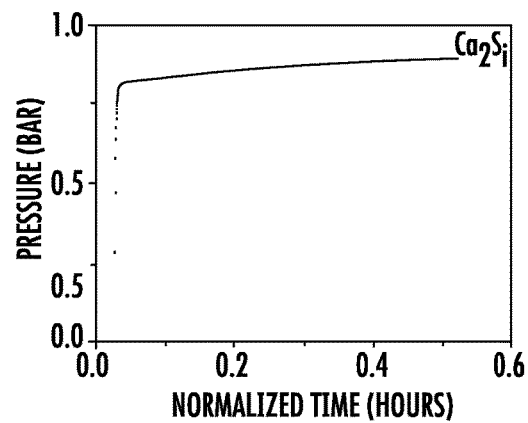
FIGS. 3A and 3B are desorption profiles for Ca$_s$Si and CaAl at 650° C. and 25 bar.
Figure 3B:
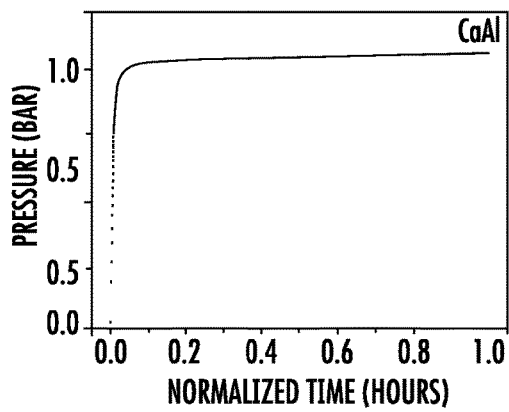
Figure 4A:
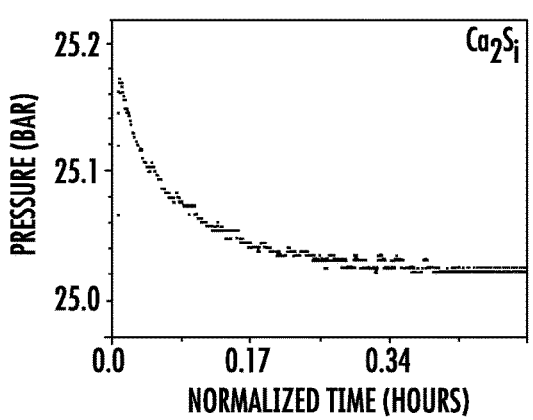
FIGS. 4A and 4B set forth absorption profiles for Ca$_s$Si and CaAl at 650° C. and 35 Bar H$_2$.
Figure 4B:
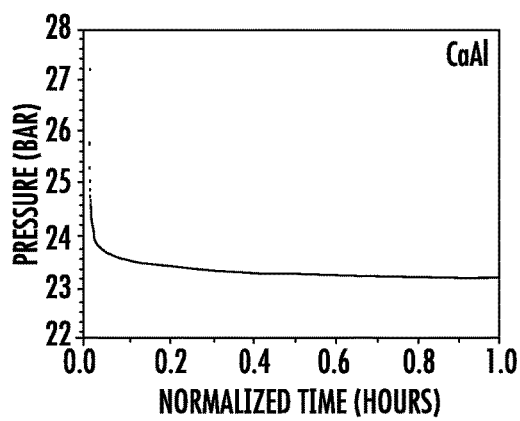

The first 50 cycles of the material cycled at 650° C. with rehydrogenation performed at 25 bar $H_2$ is shown in FIG. 2. The cycling was performed at these conditions as a proof of concept for this material and to stay within the safety basis for a current reactor design.

Figure 5:
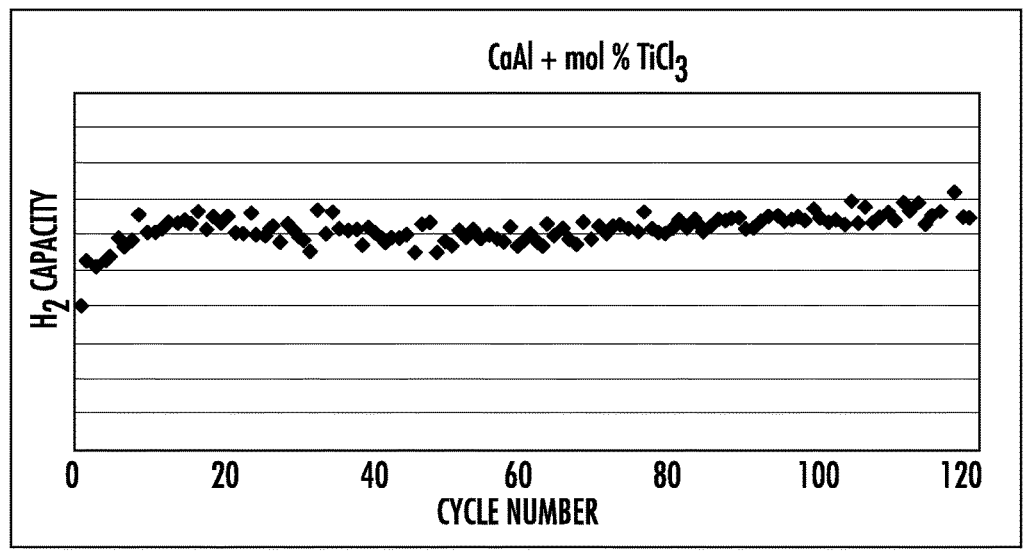
FIG. 5 sets forth cycling data for a high temperature material CaAl at 650° C. and 50 bar.

The new class of materials has demonstrated cycling ability above 650° C. with little to no observable degradation over the cycling carried out. The desorption/absorption times well out preform the target of 6 hours needed in solar heat storage system as shown in FIGS. 3A, 3B, 4A, and 4B. Cycling stability of the high temperature material CaAl and $CaAl_2$ have been carried out and show no significant degradation. CaAl cycling is shown in FIG. 5. The initial measured capacity was 1.8 wt. Cycling is repeated to determine the hydrogen weight capacity more accurately. However the material is stable over 120 cycles as shown in FIG. 5. It should be noted that these newly discovered materials are the best known materials for high temperature metal hydride thermal energy storage found to date based on cost, lack of corrosive nature, and operating temperature capability.

Another example according to the invention is to stabilize the $NaMgH_2F$ material at temperature above 650° C. by the incorporation of ½ mole Si. This allows for the stabilization of the Mg metal which has a significant vapor pressure of 1 atmosphere or greater above 600° C. and melts at about 660° C.

Figure 6:
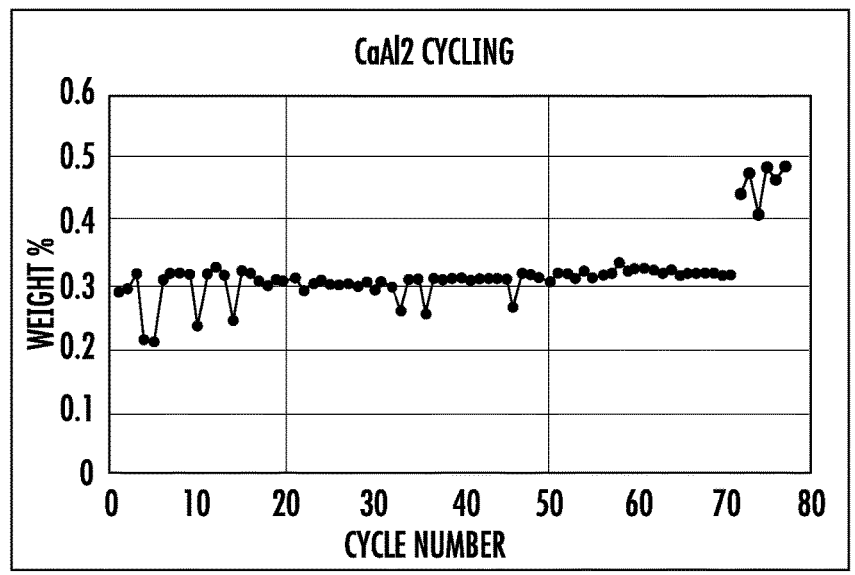
FIG. 6 is cycling for CaAl$_2$ at 25 bar and 650° C. representing 30 minute cycles.

Cycling data for the high temperature material $CaAl_2$ was acquired at 25 bar $H_2$ and 650° C. for 30 minute desorption/absorption cycles as shown in FIG. 6. The cycle stability appears promising over 70 cycles at these conditions. The data points in below the 0.3% indicator the starting pressure was 24 bar instead of 25 bar. This lower capacity is a kinetic effect since the process is operating close to the equilibrium pressure. The data points between 58-72 were optimized to start the cycles between 25-26 bar and show good stability. The data points in cycles 70-80 show a higher capacity when the time is increased to 1 hour cycles. This material will require a longer hydrogenation time to reach the higher capacities as shown by the TGA/RGA in FIG. 7.

Figure 7:
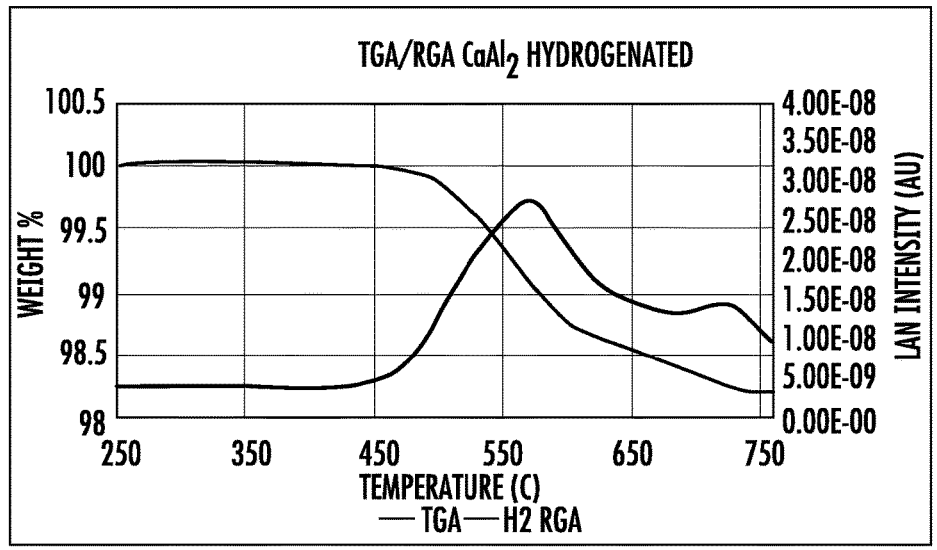
FIG. 7 is TGA/RGA of CaAl$_2$ hydrogenated at 650° C. and 95 bar H$_2$ for 6 hours.

FIG. 7 shows a 2.7 wt. % capacity when the material is hydrogenated for 6 hours at 95 bar $H_2$ and 650° C. The reversibility of this material was also established by XRD to ensure that the starting product was being regenerated upon desorption of hydrogen.

Figure 8:
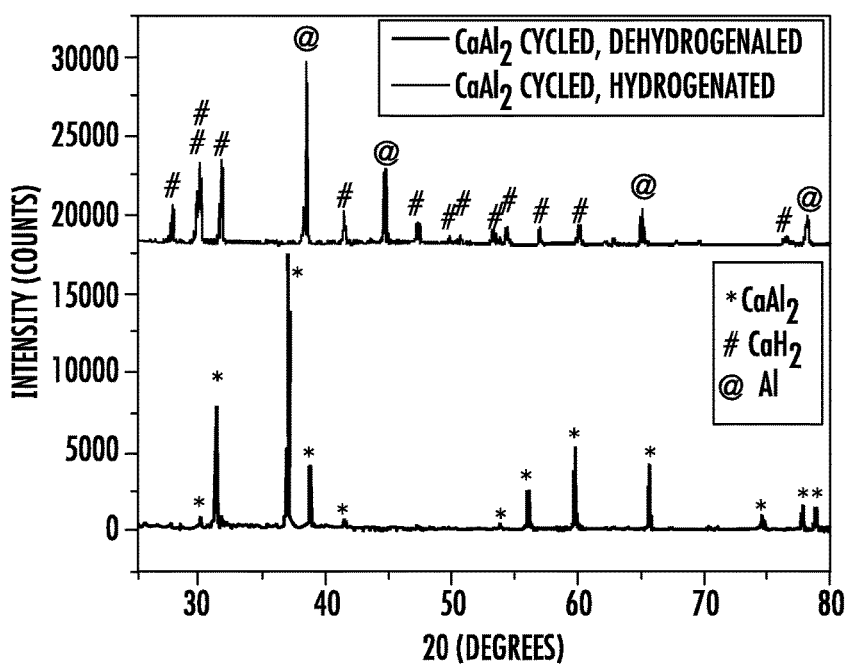
FIG. 8 is XRD spectra of CaAl$_2$ hydrogenated for 6 hours at 95 bar H$_2$ and 650° C. The upper bar is cycled hydrogenated material and the lower bar is cycled dehydrogenated material.

FIG. 8 shows the XRD spectra of the hydrogenated and dehydrogenated materials showing the formation of $CaAl_2$ in the desorbed state and $CaH_2$ and Al in the fully hydrogenated state. The calcium aluminum materials demonstrate the cycling stability, appropriate kinetics and operational temperatures required to meet the TES targets set by DOE for this application.

Figure 9:
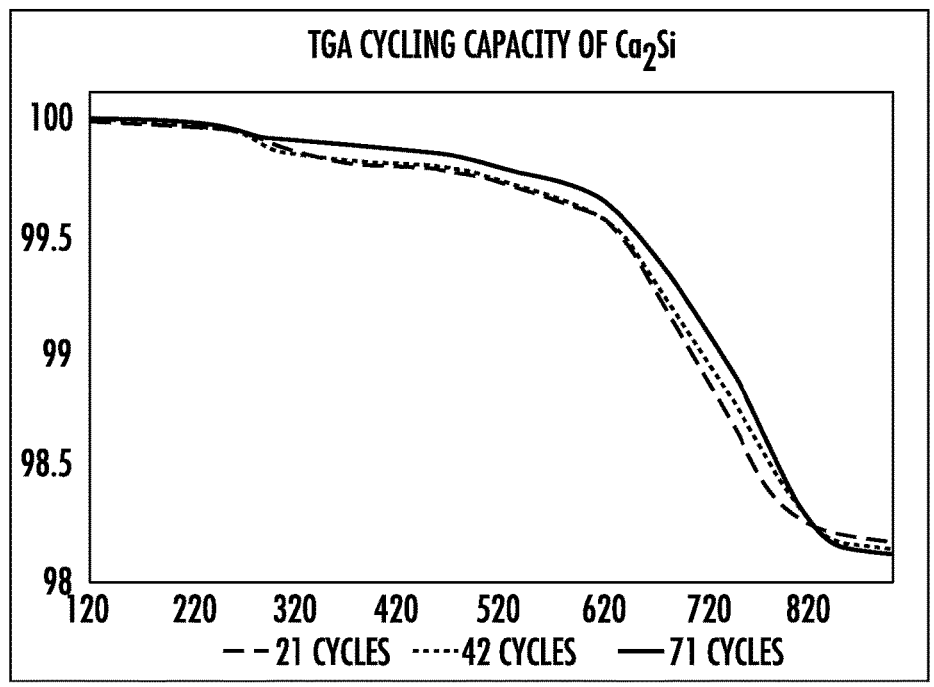
FIG. 9 is TGA data of Ca$_s$Si following various cycles at 750° C. and 49 bar H$_2$ pressure for 3 hour cycles.

FIG. 9 shows the thermal conductivity measurements of the $Ca_xSi$ material carried out at 750° C. and 49 bars for a 3 hour cycle. The thermal conductivity can be increased with the addition of additives such as copper, expanded natural graphite, and other materials described HEREIN and have been demonstrated with other metal hydrides.

Figure 10:
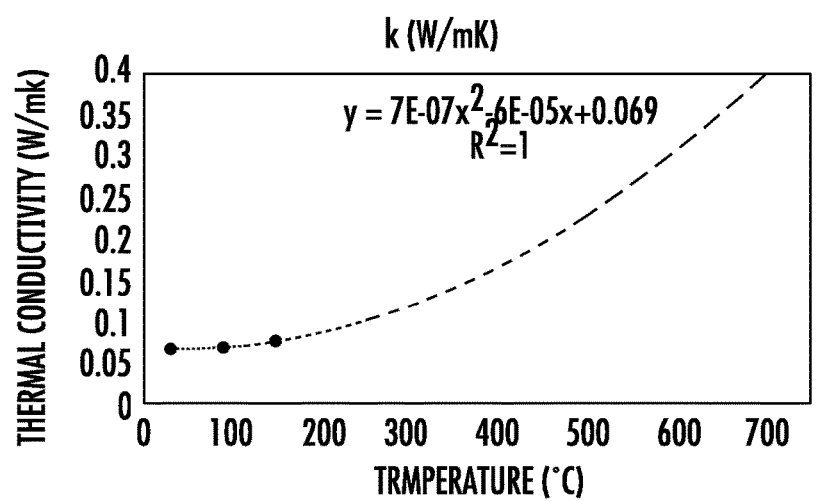
FIG. 10 is a graph of thermal conductivity of $Ca_xSi$ material after cycling (hydrogenated).

FIG. 10 sets forth the thermal conductivity of the $Ca_xSi$ material as described in reference to FIG. 9 and on cycling. The thermal conductivity data is based upon the hydrogenated state of the $Ca_xSi$ material.

The present invention uses cost effective materials to solve problems with storing thermal heat at high temperature needed to achieve high efficiency of the system. Example of these materials are, but not limited to, $CaH_2$, $LiH_2$ $MgH_2$ and $MgH_2$ complexes in combination with other elements such as, but not limited, to Al, Si, C. These combinations form composites/compounds that can be used in one side of the heat storage system as high enthalpy hydrides with desired conditions of pressure and temperatures based on the ratio of elements in the composites. This invention allows the use of less expensive materials for the low enthalpy hydrides (LEH) such as $NaAlH_4$ or $Na_3AlH_6$. Complex hydrides such as $NaAlH_4$ or $Na_3AlH_6$ are less expensive than commonly used $AB_5$ materials such $LaNi_5H_6$ or AB materials such as TiFe. By combining other elements with the hydrides at the right ratio the pressure generated to hydrogenate cost effective LEH such as $NaAlH_4$ or $Na_3AlH_6$ can be achieved.

The present invention and work has established that low temperature metal hydrides based on sodium alanates can be paired with suitable high temperature metal hydrides for thermal energy storage systems involving solar power applications. It has been found that in $Na_3AlH_6$ with additives including expanded natural graphite and aluminum metal performed well. While the hydrogen capacity of the $Na_3AlH_6$ is less than that of the $NaAlH_4$, the cycle stability and pressure required for rehydrogenation were found to be far superior.

A variety of high temperature metal hydrides may be utilized in accordance with the present invention. These include $MgH_2$, $Mg_2$, $FeH_6$, $NaMgH_3$, $H_3$, TiAl, $NaMgH_2F$, CaAl, $CaAl_2$, and $A_2S_i$. From the data obtained, $Ca_2Si$ was found to operate at very high temperatures (750° C.), had reasonable hydrogen capacity capabilities and was very low cost. The data establishes that it is possible to provide a low cost metal hydride capable of reversibly storing approximate two % weight hydrogen at 750° C.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of using metal hydride mixed with different elements to form a mixture to be used in thermal energy storage systems comprising:
    providing a dual bed hydride reactor having a HEH reaction bed and a LEH reaction bed, the HEH reaction bed containing a mixture/composite of at least one hydride selected from the group consisting of $NaMgH_3$, $MgNaFH_2$, $TiH_2$, LiH, $MgH_2$, $CaH_2$, and combinations thereof and an element selected from the group consisting of Al and Si and the LEH reaction bed containing at least one of a metal hydride selected from the group consisting of $NaAlH_4$, $Na_3AlHe_4$, FeTiHx, $MmNi_6H_5$ and combinations thereof;
    adding heat to the HEH reaction bed containing the mixture/composite to release hydrogen gas from the hydride in the mixture/composite and to form a reversible alloy comprising the element in the mixture/composite and elements from the hydride after dehydrogenation in the mixture/composite;
    transferring the released hydrogen gas from the HEH reaction bed to the LEH reaction bed; and
    dehydriding the LEH reaction bed and absorbing hydrogen released from the LEH reaction bed with the HEH reaction bed causing an exothermic process of the reversible alloy reversing to the element and the hydride of the mixture/composite such that heat yielded back from the exothermic process reaches temperatures between 650° C. to 800° C.

2. The process according to claim 1, wherein the released hydrogen gas has a pressure of at least 1 ATM.

3. The process according to claim 1, wherein the elements of Al or Si present with the at least one hydride selected from the group consisting of $NaMgH_3$, $MgNaFH_2$, $TiH_2$, LiH, $MgH_2$, $CaH_2$, and combinations thereof within the HEH reaction bed prevents the occurrence of a molten state hydride by forming the reversible alloy once the hydrogen is released thereby preventing corrosion.

4. The process according to claim 1, wherein the metal hydride of the LEH reaction bed consists of at least one of $NaAlH_4$, $Na_3AlH_6$, and $MmNi_6H_5$.

5. The process according to claim 1, wherein the mixture/composite of the HEH reaction bed comprises the hydride selected from the group consisting of at least one of $NaMgH_3$, $MgNaFH_2$, and $CaH_2$ and an element selected from the group consisting of Al and Si.

6. The process according to claim 1, further comprising tuning a ratio of the mixture/composite of the at least one hydride and the element to form the reversible alloy to reach desired temperatures and operating pressures.

7. The process according to claim 1, wherein the mixture/composite of the at least one hydride and the element used to form the reversible alloy modifies the enthalpy of the system to generate enough pressure in the HEH reaction bed to match the pressure required in the LEH reaction bed.

8. The process according to claim 1, wherein when the mixture/composite consists of $CaH_2$ and the element selected from the group consisting of Al and Si, the $CaH_2$ does not enter a molten state to release hydrogen such that corrosion is prevented, and equilibrium pressure is increased.

* * * * *